Figure 3:
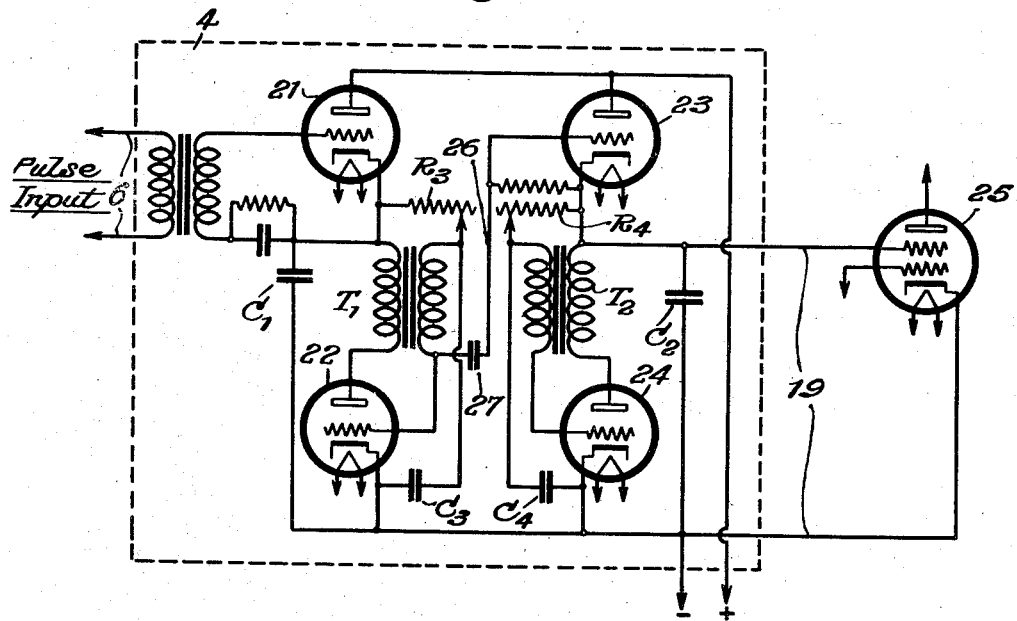

Dec. 7, 1948.  C. W. HANSELL  2,455,673
DISTANCE SELECTIVE SYSTEM
Filed Jan. 19, 1942  3 Sheets-Sheet 1
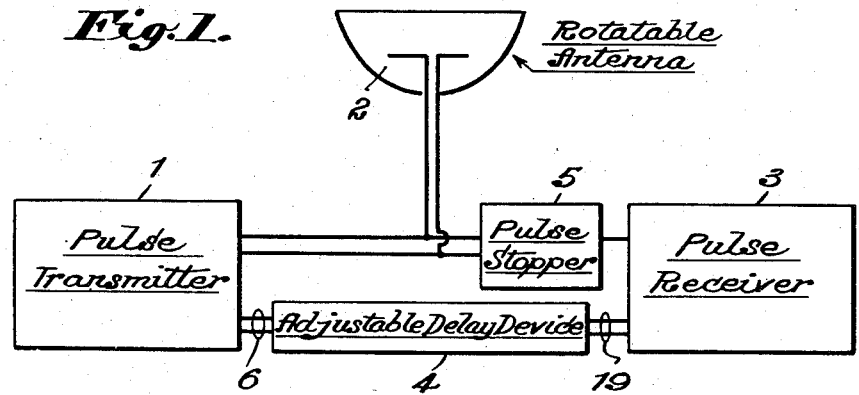
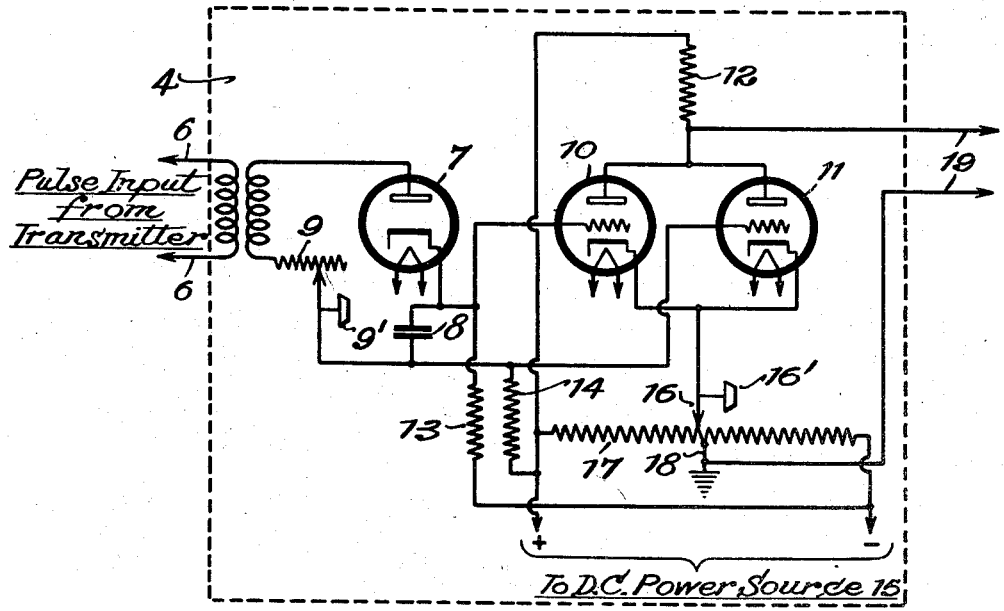
INVENTOR
Clarence W. Hansell
BY H. S. Snover
ATTORNEY Dec. 7, 1948.  C. W. HANSELL  2,455,673
DISTANCE SELECTIVE SYSTEM
Filed Jan. 19, 1942  3 Sheets-Sheet 2

INVENTOR
Clarence W. Hansell
BY
ATTORNEY

Dec. 7, 1948.　　　　C. W. HANSELL　　　　2,455,673
DISTANCE SELECTIVE SYSTEM
Filed Jan. 19, 1942　　　　　　　　　　　　3 Sheets-Sheet 3
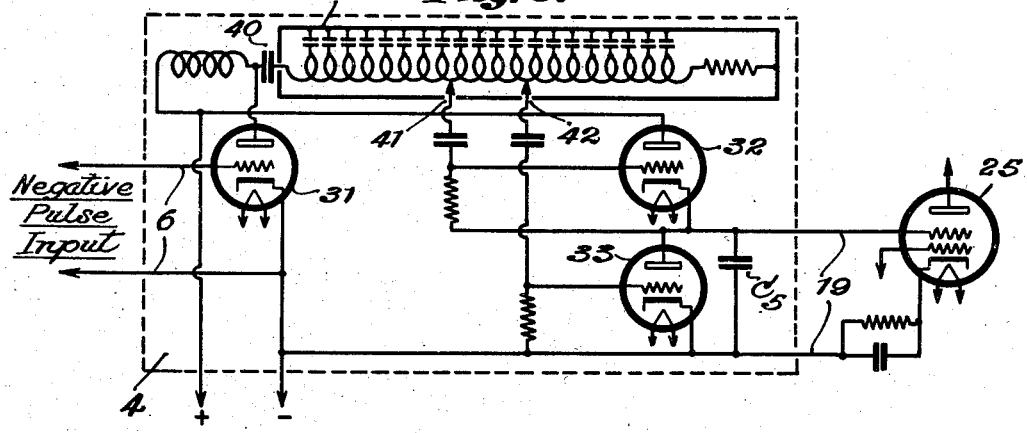
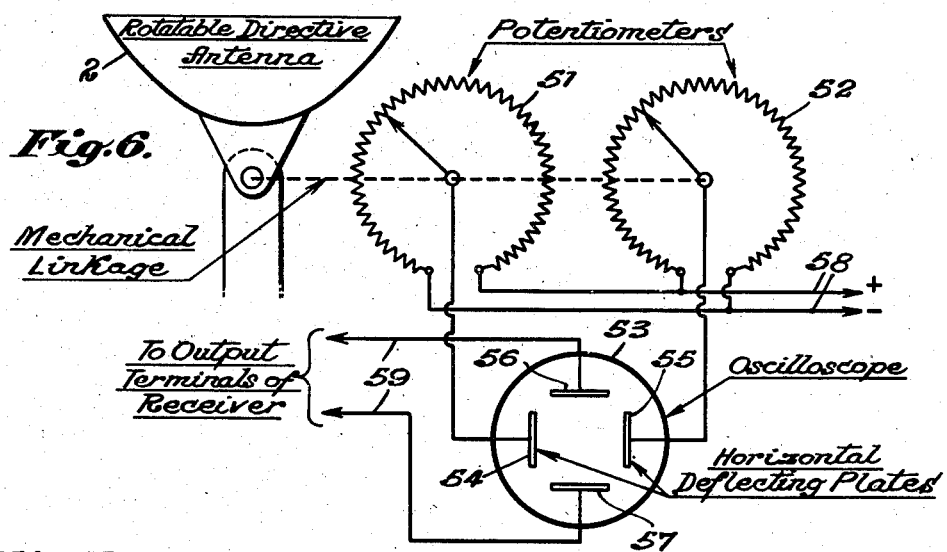
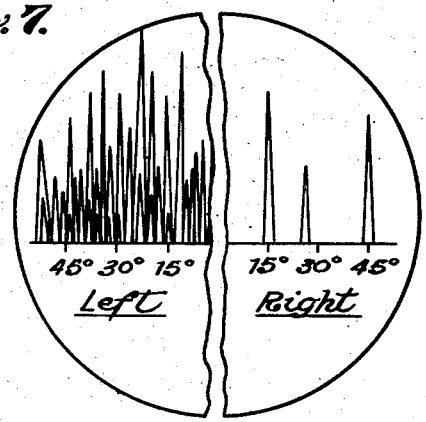
INVENTOR
Clarence W. Hansell
BY H. S. Grover
ATTORNEY Patented Dec. 7, 1948

2,455,673

UNITED STATES PATENT OFFICE 2,455,673

DISTANCE SELECTIVE SYSTEM

Clarence W. Hansell, Port Jefferson, N. Y., assignor to Radio Corporation of America, a corporation of Delaware Application January 19, 1942, Serial No. 427,266

12 Claims. (Cl. 343—11)

The present invention relates to a distance selective wave transmission and reception system. Although the invention is described hereinafter in relation to an obstacle detecting system, which obstacle may be an airplane or a ship, it should be understood that the invention is not limited thereto but has wider application. Among other things, the invention is useful for military purposes for detecting and locating ships and airplanes.

When radio wave pulses are transmitted for the detection and observation of distant and nearby objects, the objects are detected and observed by reflected pulses returning to a receiver at the same location as, or close to the transmitter. Often the object detecting system employs directive antennas, and other expedients, for both transmitter and receiver by means of which the indications are confined to objects lying within a narrow range of angles. The antennas are sometimes given a continuous motion to scan a certain range of solid angles somewhat after the fashion of scanning a television image, and these antennas are linked to a potentiometer which controls the voltage on the horizontal deflection plates of an oscilloscope.

In such a pulsing system the need has arisen to be able to emphasize the pulses returning from a particular distance and to govern this distance at will so that an observer may concentrate his or her attention upon particular objects and observe them more closely than other objects. If the object is an airplane, for example, it will frequently be desired to concentrate attention upon reflections from the plane as the distance from the observer to the plane varies rapidly.

Heretofore, this concentration upon particular distances has been accomplished, though inadequately, by the simple expedient of a manually operated volume control in the receiver. In systems for detecting and observing objects upon the surface of the sea, for example, the observer, as the transmitted and received beams sweep the horizon, observes receiver output pulses by vertical deflections on a cathode ray oscilloscope in which horizontal deflections of the electron beam follow the horizontal deflection of the antenna radiated beam. The magnitude of received pulses for various horizontal deflections is then an approximate indication of the size, or reflecting power, and distance of remote reflecting objects.

In operating the system with any fixed adjustment, the observer (in observing received pulses) cannot readily observe pulses which are too weak to give an appreciable vertical deflection of the oscilloscope nor can he observe pulses so strong as to give vertical deflection beyond the height of the oscilloscope screen such that the high vertical speed of the scanning spot gives only a faint line, even where it still lies on the screen, and during most of its travel lies off the screen. Therefore, a considerable amount of distance and object selection is obtainable by adjusting the input to the oscilloscope to cause an optimum deflection for particular pulses from objects on which attention is to be focussed.

In these prior systems, pulses coming from near and far objects do not greatly interfere with one another because they arrive back at the receiver at different times and produce vertical oscilloscope deflections independently, provided reflecting objects were not too numerous. Furthermore, moving objects in such systems do not produce a constant pattern on the oscilloscope screen but cause continual changes in amplitude or position, or both, of the traces of pulses caused by them so that, due to their changing, they can be distinguished readily from stationary objects. Furthermore, in fixed or stationary systems, an observer at any one stationary location soon becomes familiar with the normal oscilloscope trace for his or her station and, if possessed with a retentive memory, can almost instantly observe any change in pattern caused by unusual objects, even if they are stationary.

A defect in this known system has been that it provides no way to distinguish between the effects of distance and of size or reflecting power of the reflecting objects. A large object far away might be mistaken for a smaller object nearby and a small nearby object might be mistaken for a larger object far away.

A further defect in such known systems is that a multiplicity of returning pulses from a large range of distances for any given direction are sometimes all superimposed on the oscilloscope screen in a manner to cause a considerable amount of confusion and to make it difficult to observe the presence and movement of particular objects.

In another example of the prior art, in which the antenna beam is made to scan a range of solid angles by deflecting the beam both horizontally and vertically, in a manner analogous to television scanning, the returning pulses after reflection from objects, such as airplanes, are made to control the intensity of electron current in a cathode ray oscilloscope, or kinescope. In the kinescope, horizontal and vertical deflections of the electron beam are made to follow horizontal and vertical deflections of the beam of the antenna, or antennas, used for transmission and reception. By this means an image in light of the area of solid angles scanned by the antenna, or antennas, is formed on which reflecting objects are indicated by spots of more or less light intensity than their background.

In this case also it is not possible for an observer to distinguish between size of reflecting objects and distance to them and there may also be confusion due to superposition of light or dark spots on the kinescope screen, produced by waves returning by deflections from many objects in the same general direction.

In the foregoing discussion where I have mentioned size of the reflecting object, it should be noted that, strictly speaking, the amount of pulse power reflected back to the receiver is not a reliable measure of size of the reflecting object. The reflection may be directional, either toward or in some direction away from the receiver so that size, shape and orientation of the reflecting object, in combination, as well as the distance, determine the power reflected back to the receiver.

The present invention is an improvement upon the arrangements of prior systems by including, among other things, a means to control the distance from which received pulses are permitted to operate the oscilloscope or kinescope so that, by simply turning a dial, for example, an operator may select the distances for observation, excluding other distances. Furthermore, by means of another control dial in accordance with the invention, an operator may select a desired range of distances to observe, rejecting all other distances. At other times, the operator may observe all distances simultaneously but, as soon as an unusual object is observed on the oscilloscope, may concentrate attention upon that object.

The general principles which I use require the transmission of pulses and the synchronous operation of transmitter and receiver in a manner very generally described in part in my United States application Serial No. 371,865, filed December 27, 1940, now Patent No. 2,381,444, dated August 7, 1945. Briefly, in this copending application I describe a pulse transmitter and a pulse receiver so arranged and operated that the receiver is responsive to signals only when the transmitted pulses are due to arrive. Then any power arriving at the receiver in other time periods is rejected by the receiver and produces no response in the output from the receiver.

The present invention makes the receiver responsive for time intervals repeated at the same rate as the transmission of pulses and controls the length and time delay of these time intervals in such a manner as to select a desired range of distances from which reflected and returned pulses can produce a response in the receiver and a deflection of the oscilloscope, or a modulation of its electron beam current.

By this means the observing system of the invention is made to select or "focus" upon a certain range of distances, and this range of distances may be independent of the mean value of distance within the range. Putting it in other words, my invention may provide constant depth of focus, or ability to observe reflected pulses, within a large range of distances. The minimum possible value of the distance range in the present state of development is determined mainly by the length of the transmitted pulses. That is, when transmitter and receiver are located conveniently close together, usually at the same location, and sometimes using the same antenna, the transmitted pulse must be completed before the receiver can be made responsive. This comes about because of the fact that the transmitter tends to paralyze the receiver during the transmitter's operating period, due to unavoidable coupling from transmitter to the receiver. If these pulses are, say, one microsecond in length, then the minimum theoretical value of the "depth of focus" (i. e., range of distances) providing 100% time resolution of the system will be about 300 meters. Likewise, the shortest distance in this range to which the system will focus with 100% time resolution is determined by the pulse length and, in the case of one microsecond pulses will be about 150 meters. The maximum distance may be determined by the rate of repetition of pulses, but more often will be determined by the design of the equipment, the propagation characteristics of the waves used, and the interfering noise levels at the receiver.

To accomplish the purposes of the invention I employ electrical circuits for rendering the receiver circuits responsive at any time following each transmitted pulse, but before the next transmitted pulse, and for rendering them unresponsive again at any later time but before or at the beginning of the next transmitted pulse. Thus I control the portion of time and time position of receiver operation between transmitted pulses and this automatically makes the receiver responsive to a desired range of distances from which it receives reflected pulses.

Obviously, if the receiver is made to be responsive after the transmitted pulse is completed but before the reflected pulse is returned to the receiver, there will be no output from the receiver due to the reflected pulse. By the same token, if the receiver is made to be responsive after the transmitted pulse is completed, but after the reflected pulse has been returned to the receiver, again there will be no output from the receiver due to the reflected pulse. I contemplate a variety of operating adjustments of the system of the invention. I may, for example, cause the receiver to be totally unresponsive except for certain selected time intervals between transmitted pulses in such manner as to restrict reception completely to reflected waves returning from the selected range of distances, or alternatively, I may permit the receiver to be responsive during the whole time period between pulses and will make the receiver more or less responsive during selected shorter time intervals. Thus, it is possible to observe reflected waves coming from all distances within the range of equipment but to emphasize waves returning from certain ranges when attention is to be devoted to these certain ranges. Or, I may eliminate or reduce responses to waves returning from certain ranges which may otherwise make it difficult to observe other ranges. That is, I may employ the system to eliminate reception of pulses from a selected range of distances as distinguished from employing the system to provide reception of pulses from a selected range of distances.

A detailed description of the invention follows in conjunction with a drawing, wherein:

Fig. 1 diagrammatically illustrates a complete system embodying the principles of the invention;

Figs. 2 to 6, inclusive, illustrate in greater detail certain of the details which can be employed in the system of Fig. 1; and Fig. 7 represents, by way of example, two halves of an oscilloscope screen for observing the strength and number of the reflected waves returning to the receiver, one half illustrating a prior art condition, and the other half the improved trace attributed to the invention.

In the drawing, the same parts are represented by the same reference numerals throughout the figures.

Fig. 1 shows a pulse transmitter for the transmission of very short pulses or trains of radio carrier waves repeated at a constant rate and spaced by time periods which are long compared with the length of the pulses. As an example, the pulses may be, say, one-half microsecond long and, for operating distances up to about 100 miles, may be repeated at a rate of not more than about 1000 per second. For greater or lesser maximum distances, the pulses rate will be changed approximately in inverse proportion to the maximum distance.

The transmitter 1 and the receiver 3 are coupled with a rotatable unidirectional antenna 2 for radiating the pulses in a very narrow beam and for receiving portions of them which are reflected back from objects within the beam. Antenna 2 may be given a continuous angular motion over a considerable range of angles in order to sweep the horizon and sky.

Transmitter 1 may be any suitable pulse transmitter for transmitting radio frequency carrier power in the form of extremely short pulses which are constant in length and are repeated at a constant rate, determined by the maximum distance. Transmitters have been developed having these characteristics and capable of transmitting pulses of lengths down to less than one-half microsecond. It is preferred in using the transmitter of the present invention that it transmit high radio frequency carriers above 30 megacycles, although for very long distance purposes lower radio frequencies might be used because of the propagation characteristics. For most frequent application of the invention, I would expect to use radio frequencies in the range of 300 megacycles up to the highest obtainable frequencies, which may be several thousand megacycles, for example, 300 to 10,000 megacycles and higher.

Receiver 3 may be any one of known types already available in the art for receiving very short transmitted pulses reflected from objects within the beam of the antenna. The transmitter 1 and receiver 3 may be located together, if they are carefully shielded and filtered; or they may, if preferred, be in different rooms of the same or nearby buildings. Means 5 is provided for protecting the receiver from the transmitted pulses passing directly from transmitter to receiver, according to known art, when this is required. Such protective means 5 may include a coupling circuit with a spark gap or a gaseous discharge tube for automatically decreasing the receiver coupling during the periods when the transmitter is sending pulses. Preferably, this gap or discharge tube is "fired" or made active by means of direct current power pulses from the transmitter which appear before or at the same time as the radio carrier pulses. The gaps must be designed and operated so as to remove their discharge immediately at cessation of the transmitted pulse. This protective means is often required because the transmitter may send out very high peak powers sufficient to destroy some of the receiver elements if they were not protected, even though the receiver is not operative during the time of the transmitted pulses.

The receiver, which may or may not be a superheterodyne type, is so designed as to be nonresponsive to radio frequency input currents except for time periods determined by input control pulses from the transmitter. These control pulses from the transmitter are controllable in time delay, with respect to pulses radiated from the antenna, and are controllable in time length so that the receiver may be made operative during any portion of the time period between transmitted pulses, by means of apparatus 4 connected to leads 6. By this means the receiver 3 is made responsive to reflected pulses returning from any desired range of distances within limits set by the length and repetition rate of transmitted pulses. Additional details of the receiver and of apparatus 4 are given later in connection with the description of the systems of Figs. 2, 3, and 4.

Figs 2, 3, 4 and 5 illustrate several different circuit arrangements for controlling the time delay and length of the control pulses utilized to control the operating time of the receiver.

In the arrangement of Fig. 2, constant strength pulses derived from any suitable point in the transmitter pulsing system and fed over line 6 are rectified in diode 7 to charge a condenser 8 in pulses and the condenser is discharged again at a substantially constant current. This results in a saw tooth wave form of potential across the condenser 8 but the average potential across the condenser is controllable from positive to negative values and over a range determined by the amount of charge delivered to the condenser during pulses. In Fig. 2 the amount of charge delivered by pulses is determined by an adjustable resistance 9 in series with the diode rectifier 7. This resistance 9 controls the amplitude of the rectified pulse, and hence provides a control of the pulse time delay.

The condenser potential is applied between two vacuum tube triodes 10 and 11 and gives rise to sawtooth variations in their difference of grid bias potential. As a result, the two triodes have nearly equal control electrode bias potentials during time periods which follow the transmitting control pulses in line 6 by an amount of time depending on the average potential across the condenser 8.

The two triodes are so biased that they both have their anode currents stopped, or greatly reduced, when they have equal effective bias which will be the case when there is no potential across condenser 8. When they have considerably unequal bias, one tube or the other, depending on which is biased relatively positively, carries current and prevents the appearance of large positive potential across the tubes 10 and 11 (i. e., between anode and cathode) due to IR drop in the resistance 12 in series with the anode supply. Pulses appear in leads 19 only when both triodes are simultaneously nonconductive (i. e., when there is little or no current flowing in 12). At all other times one vacuum tube 10 or the other tube 11 always carries current.

The rate at which the grid biases of tubes 10 and 11 pass through equality is determined by the rate of change of condenser potential which is substantially constant between pulses regardless of the average condenser potential. This is because substantially constant current is made to flow through resistors 13 and 14. This is accomplished by giving resistors 13 and 14 a high value and connecting them to correspondingly high potential terminals of the unidirectional power supply 15. In operation, while apparatus 4 is functioning to control the receiver, the average current through resistors 13 and 14 is the same as the average current through the rectifier 7, the difference being that the rectifier 7 carries a pulsating current while the current through resistors 13 and 14 is substantially constant. Between control pulses, the currents through 13 and 14 cause a substantially constant rate of change of potential on condenser 8. Resistors 13 and 14 will be of equal value when the potentials to ground at the terminals of source 15 are equal and opposite; otherwise these resistors will have relative values substantially proportional to the differences in potentials at the terminal source 15. Therefore, the setting of the time delay by means of the tap on resistor 9 has substantially no effect upon the length of potential pulses across the triodes 10 and 11.

The length of anode potential pulses across the triodes 10 and 11 is determined by the mean or fixed bias between the control electrodes and cathodes, at the time this bias is equal on the two electrodes, and, in the arrangement shown, is determined by the adjustable potential upon the cathodes obtained by adjustable tap 16 on resistor 17, a point along which is grounded at 18.

The control pulses for the receiver 3 are derived from leads 19, the potential in which appears between one of these leads and ground. The potentials appearing in that lead 19 connected to the anodes of 10 and 11 are applied to control electrodes of one or more vacuum tube amplifiers in receiver 3. These control electrodes in this case will usually be the screen grids. Alternatively, the output from leads 19 may be applied to the control grids of the amplifier tubes through a polarity reversing tube or circuit. This last case will be used when it is desired to diminish the sensitivity of the receiver during selected time intervals between the transmitted pulses.

By the means shown, I adjust the pulse delay and pulse lengths substantially independently for delivery to the receiver 3 to make it operative. Therefore, assuming constant strength of pulses delivered from the transmitter 1, I provide two controls 9 and 16, which may have dials 9' and 16', respectively, calibrated respectively in average distance and range of distance, by means of which an operator may, at will, choose a range of distances within which the presence of reflecting objects may be observed. In this way the operator may observe over a wide range of distances and objects, or, when desired, select a single narrow range of distances for observing a single object, without interference from other objects, and determine the distance to the object. He will, of course, have a receiver volume control by means of which an optimum range of deflection on the oscilloscope may be set for each distance or size of object. If desired, this volume control may, at least in part, be ganged (i. e., linked mechanically in unicontrol fashion) with the distance selector to keep relatively constant the deflections from objects of given reflecting power or size, regardless of their distance.

In the receiver 3, an oscilloscope (i. e., a cathode ray tube with a fluorescent screen) is provided whose deflecting plates for producing horizontal deflections are supplied with potentials having values which correspond to angular direction of the antenna 2. As will be explained more in detail in connection with Fig. 6, this may be done by means of one or more potentiometers mechanically coupled to the antenna system and rotated with it. The plates in the oscilloscope for producing vertical deflections are supplied with potentials derived from the output of the receiver and these potentials vary in response to the output of the receiver. The response of the oscilloscope to the receiver input may be made proportional to the received input or preferably should be proportional to some power of the input less than one.

Referring to Fig. 3, I have shown two tubes in series labeled respectively 21 and 22. Input pulses are delivered to tube 21 and cause it to charge condenser $C_1$. As a result, an anode potential is applied to tube 22 through the primary winding of transformer $T_1$, and after an interval of time determined by the values of resistance $R_3$ and condenser $C_3$, tube 22 begins to pass anode current and by feed back through both windings of transformer $T_1$ passes a pulse of current which quickly discharges condenser $C_1$ through the primary winding of $T_1$ and tube 22. In the process of discharging condenser $C_1$, the grid of tube 22 is made to carry grid current so that after the pulse of anode current in tube 22 its grid has a relatively high negative bias by virtue of rectification between grid and cathode of tube 22, which negative bias remains until it is overcome by current passing through $R_3$ after another control pulse from line 6 is delivered to the system. At the same time that the grid of tube 22 is pulsed positive by transformer $T_1$, the grid of tube 23 is also pulsed positive because of connection 26 including blocking condenser 27. This results in a delivery of charge to condenser $C_2$ through tube 23. Condenser $C_2$ holds this charge until current through resistance $R_4$ into condenser $C_4$ makes the grid of tube 24 sufficiently positive to start anode current flowing through the primary of transformer $T_2$. Then tube 24 by virtue of feed back through transformer $T_2$ quickly discharges condenser $C_2$. At a point between tubes 23 and 24, output corresponding to the potential across condenser $C_2$ is taken out by leads 19 and used to control the screen grid potential of one or more tubes in receiver 3 which are to be made operative during a selected time period. Such tubes are illustrated by 25. Alternatively, of course, output from leads 19 may be utilized through a potential change reversing tube to render tubes in the receiver 3 inoperative during chosen time periods between transmitter pulses.

The operation of the system of Fig. 3 follows: An input control pulse over line 6 charges condenser $C_1$ and this condenser is discharged again after a controllable time interval determined by the adjustment of resistance $R_3$. When the condenser $C_1$ is discharged, condenser $C_2$ is charged and this gives us the beginning of the operating time period for tube 25. Then at a later time, adjustable by means of resistance $R_4$, tube 25 is rendered inoperative again. Therefore, an operator by simply adjusting the values of the resistances $R_3$ and $R_4$ can control the time of beginning and ending of operative time periods of tube 25. Thus we have a system to provide output pulses to the receiver 3 which are controlled in length and in time delay with respect to input pulses.

Figure 4:
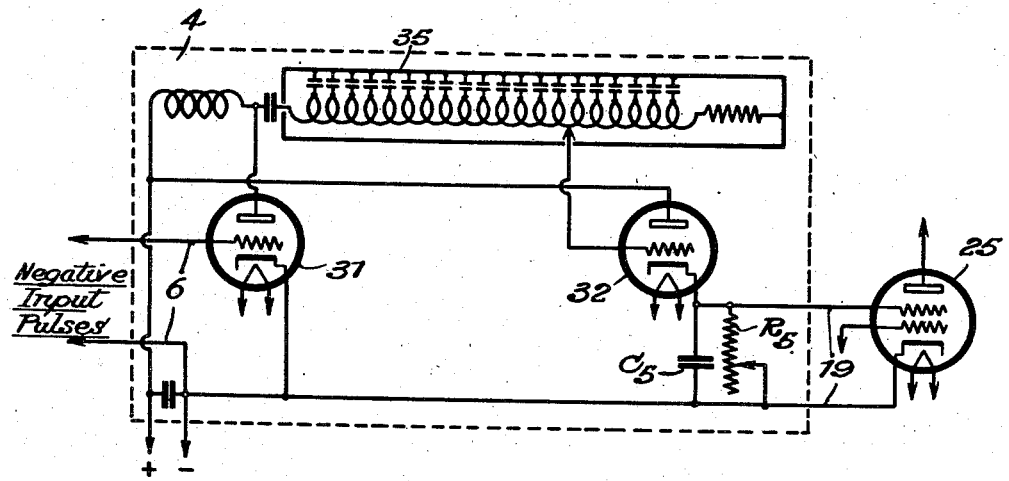

Fig. 4 shows another system for accomplishing the same purpose as Figs. 2 and 3. Negative control pulses are delivered to tube 31 causing it to apply a pulse of potential to the artificial line pulse delayer 35. This control pulse actuates the grid of tube 32 positively to pass a pulse of current at a time which is delayed with respect to the control pulse by the delay time of the portion of artificial line between tubes 31 and 32. The passage of the pulse of current through tube 32 charges condenser $C_5$ to a positive potential which results in making tube 25 operative. Then at a later time, determined by the value of resistance $R_5$, the charge on condenser $C_5$ leaks off sufficiently to render tube 25 inoperative again. Thus, Fig. 4 provides another means to provide output pulses which are controlled in length and in time delay with respect to the control pulses.

Fig. 5 is another arrangement in which negative pulses are delivered to tube 31 causing it to apply positive potentials to an artificial transmission line 35. At a later time, determined by the length of line 35 included between points 40 and 41, tube 32 is made to pass a pulse of current thereby charging condenser $C_5$ and making tube 25 operative. At a later time, again dependent upon the length of artificial line included between points 41 and 42, tube 33 is made conducting, thereby discharging condenser $C_5$ and stopping operation of tube 25. Thus, by adjusting two tapping points on the artificial line 35, I can control the time delay and the length of the output pulses resulting from input control pulses and thereby control the timing and length of receiver operative periods.

Fig. 6 illustrates one means for correlating the direction of transmission and reception of pulses with horizontal deflections of the electron beam in a cathode ray oscilloscope tube. In this figure the axle of the rotatable antenna 2 is mechanically connected to the rotatable elements of potentiometers 51 and 52. The potentiometers are supplied with constant direct current potentials over leads 58. As the antenna is rotated the adjustments of potentiometers 51 and 52 are changed and result in a differential change of potential upon horizontal beam deflecting plates 54 and 55 of the oscilloscope 53. This results in the electron beam of the oscilloscope deflecting in one direction or the other in synchronism or consonance with deflections of the beam of radiation and reception of the antenna system 2.

Output from the receiver 3 of Fig. 1 is applied in controllable amount over leads 59 between the vertical deflecting plates 56 and 57 of oscilloscope 53. As a result, the oscilloscope shows a pattern indicating the relative strength of reflected and returning waves in each direction toward which the antenna points as it sweeps the horizon. By using a fluorescent screen with sufficiently long persistence of light emission after passage of the electron beam, and by using a sufficiently high sweeping rate, a substantially continuous record will appear to be present on the whole of the trace.

Fig. 7 represents two halves of an oscilloscope screen for observing the strength and number of reflected waves returning to the receiver. The left screen portion illustrates a condition which can exist before application of the invention in which a large number of returning pulses are indicated by superimposed traces, which leads to much confusion of the traces. The right screen portion illustrates a possible clarification of the traces by eliminating the effect of all but those reflected pulses which return from a narrow range of distances. Obviously, the traces from certain selected reflecting objects may be followed more easily and, by means of the receiver timing adjustment the distance to the object may be determined, and its angle may be determined more accurately.

In the pulsing system for scanning a range of vertical angles, as well as horizontal angles, television fashion, two sets of potentiometers (like 51 and 52 of Fig. 6) may be used. One set of potentiometers will correlate horizontal antenna beam deflections with horizontal deflections of the electron beam in the oscilloscope and the other will correlate the vertical deflections by applying potentials between vertical deflecting plates 56 and 57 of oscilloscope 53. In this case, receiver output currents will be used to modulate the potential of a control electrode of the oscilloscope (kinescope) tube to modulate the strength of electron current with returning wave pulses reflected from objects. In this case also, addition of the distance selective system of the invention reduces confusion and makes it possible to determine both horizontal and vertical direction and distance to the reflecting object.

The principles of the invention are not limited to radio systems but may be applied to any system of electrical or mechanical wave transmission, such as submarine signalling. In submarine signalling, the transmission will be carried out by means of mechanical or supersonic sound waves in the water by employing means to convert alternating electrical current power into vibrational wave power transmitted through the water in directional beams. Some of the power will be reflected back toward the source by objects in the water, such as ships and submarines. Returning reflected wave power is then converted into electrical power and the system functions in a manner similar to the radio system described. In submarine signalling, the velocity of vibrational waves in the water will, of course, be much less than the velocity of radio waves so that, in general, pulses will be longer, the pulse rate will be slower, the radiator and receptor system will turn slower, and usually, the carrier frequency will be lower.

What is claimed is:

1. A distance selective obstacle detecting system comprising a transmitter for sending short radio carrier wave pulses spaced in time an amount which is large compared to the time of each pulse, a unidirectional angularly rotatable antenna for said transmitter, a receiver responsive for time intervals lying between periods of pulse transmission, means coupling said transmitter and receiver for varying independently the duration and the starting time of responsive periods of said receiver, a cathode ray oscilloscope coupled to the output of said receiver, a potentiometer for applying a deflecting voltage to certain deflecting plates of said oscilloscope, and a coupling link between said antenna and said potentiometer, whereby movement of said antenna varies the voltage on said deflecting plates.

2. A distance selective obstacle detecting system comprising a transmitter for sending short radio carrier wave pulses spaced in time an amount which is large compared to the time of each pulse, a unidirectional angularly rotatable antenna for said transmitter, a receiver, a circuit for delivering pulses from said transmitter to said receiver for making said receiver operative for time periods repeated in synchronism with the transmitted pulses, said circuit including means for delaying the delivered pulses, and varying the length of these pulses delivered to said receiver, a cathode ray oscilloscope coupled to the output of said receiver and having deflecting plates for producing a horizontal deflection of the cathode ray in said oscilloscope, an adjustable resistor for applying a deflecting voltage to said deflecting plates, and a coupling link between said antenna and said resistor, whereby movement of said antenna varies the voltage on said deflecting plates.

3. The method of detecting an obstacle by radio waves which comprises radiating in the direction of the obstacle to be detected short radio carrier wave pulses spaced in time compared to the time of each pulse, receiving the waves reflected from said obstacle at time intervals lying between the periods of pulse radiation, controlling the duration and starting time of the receiving responsive periods for determining the particular range of distances within which said obstacle lies, automatically controlling the deflection of an electron beam in accordance with the direction of radiation of the radio carrier pulses, and producing a visual indication by said electron beam upon reception of the waves reflected by said obstacle.

4. A distance selective wave system comprising a transmitter for sending short radio carrier wave pulses spaced in time an amount which is large compared to the time of each pulse, an antenna for said transmitter having means for varying the directivity pattern thereof, a receiver at the same location as said transmitter, a circuit connecting said transmitter and receiver for delivering pulses to said receiver, said circuit including means having a dial for controlling the delay time of the pulses delivered to the receiver and another dial for controlling the length of the pulses delivered to the receiver, whereby said receiver is made responsive to particular time intervals lying between periods of pulse transmission.

5. A distance selective wave system comprising a transmitter for sending short radio carrier wave pulses spaced in time an amount which is large compared to the time of each pulse, a rotatable parabolic antenna for said transmitter, a receiver at the same location as said transmitter, a circuit connecting said transmitter and receiver for delivering pulses to said receiver, said circuit including means having a dial for controlling the delay time of the pulses delivered to the receiver and another dial for controlling the length of the pulses delivered to the receiver, whereby said receiver is made responsive to particular time intervals lying between periods of pulse transmission, a cathode ray oscilloscope having its plates for producing a vertical deflection of the cathode ray coupled to the output of said receiver and having its plates for producing horizontal deflection of the cathode ray connected to a source of potential, and means linking the rotatable antenna to said source for causing said source to supply potentials to said last plates which correspond to positions of angular rotation of said antenna.

6. A system in accordance with claim 2, characterized in this that said circuit means includes a diode rectifier having an adjustable control for delaying the pulses to be delivered to the receiver and also includes a pair of vacuum tubes provided with a variable bias adjustment for controlling the length of the pulses delivered to the receiver.

7. An obstacle detecting system in accordance with claim 5, characterized in this that said first dial is calibrated in average distance and said second dial is calibrated in range of distances of the obstacle to be observed from said antenna.

8. An object detecting system comprising a radio transmitter for radiating carrier wave pulses of short duration spaced in time an amount which is large compared to the time of each pulse, and a receiver responsive to received pulses reflected from an object to be detected solely between periods of pulse transmission, said receiver having means associated therewith for varying the duration of said responsive periods, and means for varying the starting time of said responsive periods independently of said last means.

9. In a pulse-echo radar system, means for transmitting periodically recurring radio pulses which are short compared with their repetition period, means for receiving said pulses after reflection from a reflecting surface and for indicating reception of said pulses, means for producing periodically recurring control pulses in synchronism with said radio pulses and means for applying said control pulses to said second means, means for causing said second means to indicate received pulses during and only during the application of a control pulse to the second means, means for varying the duration of each control pulse to obtain control pulses of a desired width or duration, and means for phasing said desired width pulses without changing their width to cause them to occur at any desired time between successive transmitted pulses.

10. In a pulse-echo radar system, means for transmitting periodically recurring radio pulses which are short compared with their repetition period, means for receiving said pulses after reflection from a reflecting surface, means for indicating reception of said pulses, means for producing periodically recurring control pulses in synchronism with said radio pulses and means for applying said control pulses to said receiving means, means for causing said receiving means to be operative to pass received pulses to said indicating means during and only during the application of a control pulse to the receiving means, means for adjusting the starting time of each control pulse, and means for varying the duration of each control pulse independently of said starting time.

11. A pulse-echo radar system comprising means for transmitting periodically recurring radio pulses, means for receiving said pulses after they are reflected from a reflecting surface and for indicating reception of said pulses, said radar system including at least one directive antenna, means for moving the radiation pattern of said antenna in a certain plane, said second means including cathode ray tube means for visually indicating reception of said pulses, means for deflecting the cathode ray of said tube along a time axis, means for starting the sweep of said cathode ray along the time axis at a time which is a function of the angular position of said radiation pattern in said plane whereby the position of a received pulse indication on said time axis is a measure of the angular position of said radiation pattern, means for producing periodically recurring control pulses in synchronism with said radio pulses and means for applying said control pulses to said second means, means for causing said second means to indicate received pulses during and only during the application of a control pulse to said second means, means for varying the duration of each control pulse to obtain control pulses of a desired width or duration, means for phasing said desired width pulses without changing their width to cause them to occur at any desired time between successive transmitted pulses, and means for indicating said phasing in terms of distance to said reflecting surface.

12. A pulse-echo radar system comprising means for transmitting periodically recurring radio pulses, means for receiving said pulses after they are reflected from a reflecting surface and for indicating reception of said pulses, said radar system including at least one directive antenna, means for moving the radiation pattern of said antenna in a certain plane, said second means including cathode ray tube means for visually indicating reception of said pulses, means for deflecting the cathode ray of said tube along a time axis, means for starting the sweep of said cathode ray along the time axis at a time which is a function of the angular position of said radiation pattern in said plane whereby the position of a received-pulse indication on said time axis is a measure of the angular position of said radiation pattern, means for producing periodically recurring control pulses in synchronism with said radio pulses and means for applying said control pulses to said second means, means for causing said second means to indicate received pulses during and only during the application of a control pulse to said second means, means for adjusting the starting time of each control pulse, means for varying the duration of each control pulse independently of said starting time, and means for indicating said starting time in terms of distance to said reflecting surface.

CLARENCE W. HANSELL.

REFERENCES CITED

The following references are of record in the file of this patent:

UNITED STATES PATENTS

| Number | Name | Date |
|---|---|---|
| 2,055,883 | Terry | Sept. 29, 1936 |
| 2,151,549 | Becker | Mar. 21, 1939 |

FOREIGN PATENTS

| Number | Country | Date |
|---|---|---|
| 113,233 | Australia | June 2, 1941 |
| 812,975 | France | Feb. 15, 1937 |
| 853,994 | France | Dec. 23, 1939 |